(12) United States Patent
Kim et al.

(10) Patent No.: US 10,829,380 B2
(45) Date of Patent: Nov. 10, 2020

(54) SILICA AEROGEL BLANKET FOR ULTRA-HIGH TEMPERATURE, METHOD FOR PRODUCING SAME, AND METHOD FOR CONSTRUCTING SAME

(71) Applicant: LG CHEM, LTD., Seoul (KR)

(72) Inventors: Mi Ri Kim, Daejeon (KR); Je Kyun Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 34 days.

(21) Appl. No.: 16/067,066

(22) PCT Filed: Sep. 12, 2017

(86) PCT No.: PCT/KR2017/010005
§ 371 (c)(1),
(2) Date: Jun. 28, 2018

(87) PCT Pub. No.: WO2018/056626
PCT Pub. Date: Mar. 29, 2018

(65) Prior Publication Data
US 2019/0062167 A1  Feb. 28, 2019

(30) Foreign Application Priority Data

Sep. 23, 2016 (KR) .................. 10-2016-0122458
Sep. 11, 2017 (KR) .................. 10-2017-0115903

(51) Int. Cl.
*C01B 33/149* (2006.01)
*F16L 59/147* (2006.01)
(Continued)

(52) U.S. Cl.
CPC ......... *C01B 33/149* (2013.01); *B01J 13/0091* (2013.01); *B01J 27/04* (2013.01);
(Continued)

(58) Field of Classification Search
None
See application file for complete search history.

(56) References Cited

U.S. PATENT DOCUMENTS 5,789,075 A * 8/1998 Frank .................. B01J 13/0091
428/312.6
2003/0044149 A1 * 3/2003 Fraval .................... G02B 1/048
385/125
(Continued)

FOREIGN PATENT DOCUMENTS

EP  3354620  8/2018
EP  3354620 A1 * 8/2018 .............. B01J 27/24
(Continued)

OTHER PUBLICATIONS

Yang et al., "Ambient-dried low dielectric SiO2 aerogel thin film," Journal of Non-Crystalline Solids 221: 151-156 (1997).
(Continued)

*Primary Examiner* — Peter A Salamon
(74) *Attorney, Agent, or Firm* — Dentons US LLP

(57) ABSTRACT

The present invention relates to a silica aerogel blanket for ultra-high temperature, a method for producing the same, and a method for constructing the same. More specifically, the present invention provides a method for producing a silica aerogel blanket, the method capable of suppressing the generation of a bad odor during construction by including a step of heat treatment after producing a hydrophobic silica aerogel blanket so as to remove a volatile organic compound (VOC), a silica aerogel blanket produced thereby, and a method for constructing a silica aerogel blanket for ultra-high temperature, the method capable of suppressing the generation of a bad odor during the construction of the silica aerogel blanket produced by the above-mentioned production method on an ultra-high temperature piping equipment,
(Continued)

and at the same time, preventing the loss of heat insulation performance due to moisture in the air.

11 Claims, 4 Drawing Sheets

(51) Int. Cl.

| | | |
|---|---|---|
| C01B 33/158 | (2006.01) | |
| C01B 33/159 | (2006.01) | |
| C01B 33/155 | (2006.01) | |
| F16L 59/02 | (2006.01) | |
| F16L 59/06 | (2006.01) | |
| B01J 13/00 | (2006.01) | |
| B01J 27/04 | (2006.01) | |
| B01J 27/10 | (2006.01) | |
| B01J 27/24 | (2006.01) | |

(52) U.S. Cl.
CPC ............. *B01J 27/10* (2013.01); *B01J 27/24* (2013.01); *C01B 33/155* (2013.01); *C01B 33/158* (2013.01); *C01B 33/159* (2013.01); *C01B 33/1585* (2013.01); *F16L 59/021* (2013.01); *F16L 59/026* (2013.01); *F16L 59/029* (2013.01); *F16L 59/06* (2013.01); *F16L 59/147* (2013.01)

(56) References Cited

U.S. PATENT DOCUMENTS

| | | | | |
|---|---|---|---|---|
| 2005/0079337 A1* | 4/2005 | Hashida | .............. | C04B 38/0045 428/304.4 |
| 2011/0197987 A1* | 8/2011 | Koravos | ............... | F16L 59/026 138/149 |
| 2012/0171488 A1 | 7/2012 | Yeo et al. | | |
| 2016/0003404 A1* | 1/2016 | Shibata | ..................... | B32B 7/12 428/192 |
| 2016/0280557 A1* | 9/2016 | Kim | ..................... | B01J 13/0091 |
| 2016/0319983 A1 | 11/2016 | Koravos et al. | | |
| 2018/0016152 A1* | 1/2018 | Huber | ..................... | C03C 25/42 |
| 2018/0134566 A1* | 5/2018 | Kim | .................. | B01J 31/02 |
| 2019/0062167 A1* | 2/2019 | Kim | ..................... | C01B 33/158 |

FOREIGN PATENT DOCUMENTS

| | | |
|---|---|---|
| JP | 2005-008424 | 1/2005 |
| KR | 10-0710887 | 4/2007 |
| KR | 10-2010-0053350 | 5/2010 |
| KR | 10-2011-0126381 | 11/2011 |
| KR | 10-2012-0076997 | 7/2012 |
| KR | 10-2017-0104954 | 9/2017 |
| WO | 200010044 | 2/2000 |
| WO | 2014/132652 | 9/2014 |
| WO | 2016123724 | 8/2016 |

OTHER PUBLICATIONS

Liu et al., "Influence of thermal process on microstructural and physical properties of ambient pressure dried hydrophobic silica aerogel monoliths," J. Sol-Gel Sci. Technol. 62: 126-133 (2012).
Venkateswara et al., "Effect of precursors, methylation agents and solvents on the physicochemical properties of silica aerogels prepared by atmospheric pressure drying method," Journal of Non-Crystalline Solids 296: 165-171 (2001).
Search Report of European Patent Office in Appl'n No. EP17853340, dated Nov. 13, 2018.
Partial Search Report of European Patent Office in Appl'n No. EP17853340, dated Aug. 30, 2018.

* cited by examiner

SILICA AEROGEL BLANKET FOR ULTRA-HIGH TEMPERATURE, METHOD FOR PRODUCING SAME, AND METHOD FOR CONSTRUCTING SAME

CROSS-REFERENCE TO RELATED APPLICATIONS

This application is a National Stage Application of International Application No. PCT/KR2017/010005 filed on Sep. 12, 2017, which claims priority to and the benefit of Korean Patent Application Nos. 10-2016-0122458, filed on Sep. 23, 2016, and 10-2017-0115903, filed on Sep. 11, 2017, in the Korean Intellectual Property Office, the disclosures of which are incorporated herein in their entirety by reference for all purposes as if fully set forth herein.

TECHNICAL FIELD

The present invention relates to a method for producing a silica aerogel blanket for ultra-high temperature, the method including a step of heat treatment after producing a hydrophobic silica aerogel blanket, a silica aerogel blanket for ultra-high temperature produced thereby, and a method for constructing the same.

BACKGROUND ART

An aerogel is a superporous, high specific surface area ($\geq 500$ m$^2$/g) material having a porosity of about 90 to 99.9% and a pore size in the range of 1 to 100 nm, and is a material excellent in ultra-light weight, super heat insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for supercapacitors, and electrode materials for seawater desalination have been actively studied.

The biggest advantage of the aerogel is that the aerogel has a super-insulation exhibiting a thermal conductivity of 0.300 W/m·K or less, which is lower than that of an organic insulation material such as conventional Styrofoam, and that fire vulnerability and the occurrence of harmful gases in case of fire which are fatal weaknesses of the organic insulation material can be solved.

In general, the aerogel is produced by preparing a hydrogel from a silica precursor such as water glass and TEOS, and removing a liquid component inside the hydrogel without destroying a microstructure. The typical form of a silica aerogel may be classified into three types, i.e., powder, granule, and monolith, and the silica aerogel is generally produced in the form of powder.

In the case of the powder, the powder can be made into a composite with fibers and can be commercialized in the form of an aerogel blanket or an aerogel sheet. Such aerogel blankets and aerogel sheets can be bent, folded, or cut in any size or shape due to the flexibility thereof, and therefore, can be applied not only to industrial applications such as heat insulation panels for LNG carriers, industrial insulation materials, spacesuits, transportation, vehicles, and insulation materials for electric power production, but also to household goods such as jackets and sports shoes. In addition, when a silica aerogel is used in fireproof doors as well as roofs and floors in housing such as an apartment, there is a great effect in fire prevention.

In order to prevent the loss of heat insulation performance due to the absorption of moisture in the air by the silica aerogel blanket, the surface of the silica aerogel has been hydrophobized through surface modification. However, when such hydrophobic silica aerogel blanket was directly constructed on a high temperature pipe of 500° c. or higher, there was a problem of causing pain to workers due to a serious bad odor generated by a volatile organic compound (VOC) or the like.

Therefore, the present inventors have developed a method for producing a silica aerogel blanket for ultra-high temperature, the method capable of suppressing the generation of a bad odor during construction, and also preventing the loss of heat insulation performance due to moisture in the air, a silica aerogel blanket for ultra-high temperature produced thereby, and a method for constructing the same.

PRIOR ART DOCUMENT

[Patent Document 1]
Korean Patent Application Publication No. 10-0710887 (published on Apr. 27, 2007)

DISCLOSURE OF THE INVENTION

Technical Problem

An aspect of the present invention provides a method for producing a silica aerogel blanket, the method capable of suppressing the generation of a bad odor during construction by including a step of heat treatment after producing a hydrophobic silica aerogel blanket so as to remove a volatile organic compound (VOC), and a silica aerogel blanket produced thereby.

Another aspect of the present invention provides a method for constructing a silica aerogel blanket for ultra-high temperature, the method capable of suppressing the generation of a bad odor during the construction of the silica aerogel blanket produced by the above-mentioned production method on an ultra-high temperature piping equipment, and at the same time, preventing the loss of heat insulation performance due to moisture in the air.

Technical Solution

According to an aspect of the present invention, there is provided a method for producing a silica aerogel blanket, the method including the steps of 1) preparing a silica sol by mixing a silica precursor, alcohol, and an acidic aqueous solution; 2) producing a silica gel composite by adding a basic catalyst to the silica sol, and then depositing the silica sol added with the basic catalyst in a base material for blanket; 3) producing a hydrophobic silica aerogel by aging, surface modifying, and drying the silica gel composite; and 4) heat treating the hydrophobic silica aerogel.

According to another aspect of the present invention, there is provided a silica aerogel blanket produced by the above-described production method, and having a carbon content of 1 wt % or less based on the weight of a silica aerogel.

According to another aspect of the present invention, there is provided a method for constructing a silica aerogel blanket including the steps of 1) constructing at least one layer of the silica aerogel blanket of the present invention on the surface of a piping equipment; and 2) constructing at least one layer of a hydrophobic silica aerogel blanket on the silica aerogel blanket.

Advantageous Effects

A method for producing a silica aerogel blanket according to the present invention, and a silica aerogel blanket produced thereby, have an effect of suppressing the generation of a bad odor during the construction of the silica aerogel blanket on an ultra-high temperature piping equipment by including a step of heat treatment after producing a hydrophobic silica aerogel blanket so as to remove a volatile organic compound (VOC).

In addition, a method for constructing a silica aerogel blanket of the present invention has an effect of suppressing the generation of a bad odor, and at the same time, preventing the loss of heat insulation performance due to moisture in the air during the construction of the silica aerogel blanket on an ultra-high temperature piping equipment by including the steps of constructing at least one layer of the silica aerogel blanket of the present invention on the surface of a piping equipment, and constructing at least one layer of a hydrophobic silica aerogel blanket on the silica aerogel blanket.

BRIEF DESCRIPTION OF THE DRAWINGS

The following drawings attached herein illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
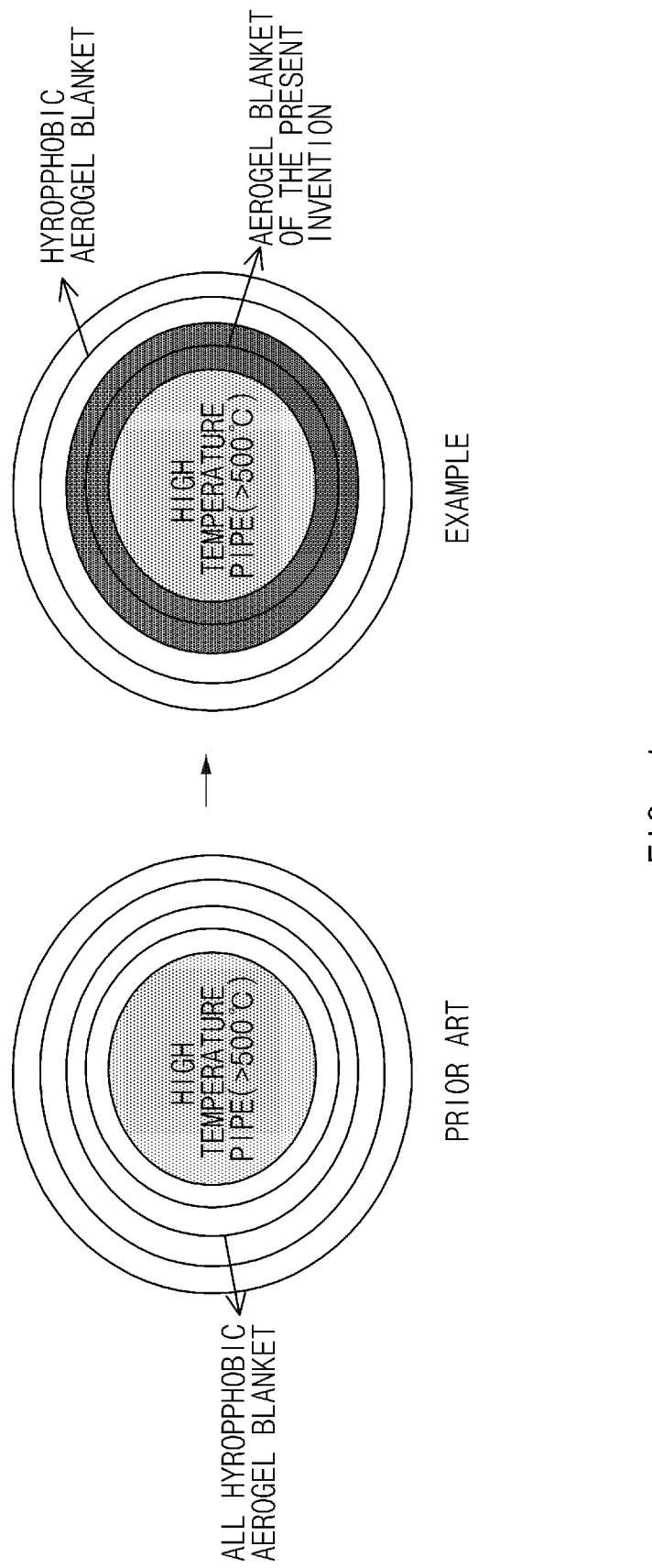
FIG. 1 is a schematic diagram schematically showing a method for constructing a silica aerogel blanket according to the prior art, and a method according to an embodiment of the present invention.

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A silica aerogel blanket is a material which is made of a silica aerogel material in the form of a mattress or a sheet by being composited with a fiber and the like as a base material for blanket, and has a characteristic of being bent, folded or cut due to the flexibility thereof. A silica aerogel imparts heat insulation properties due to the porosity thereof, and a base material for blanket such as a fiber serves to enhance the flexibility and mechanical strength of the silica aerogel blanket.

Such silica aerogel blanket is a new material superior in heat resistance and heat insulation to a polystyrene foam or a polyurethane foam, which is a conventional polymer insulation material, and is attracting attention as a high-tech material capable of solving the energy saving and environmental problems developed in the future. Accordingly, a silica aerogel blanket is used as an insulation material, a heat insulation material, or a non-flammable material for an aircraft, a ship, an automobile, a building structure, and the like, as well as for piping of various industrial facilities, or plant facilities for insulation and cooling such as an industrial furnace.

However, when a silica aerogel blanket is directly constructed on an ultra-temperature pipe of 500° c. or higher, there is a problem in that a seriously bad odor is caused by a lubricant of the fiber, or by a volatile organic compound (VOC) generated from a hydrophobized silica aerogel.

When a hydrophilic silica aerogel blanket is produced without hydrophobic modification for reducing a bad odor caused by a VOC of a silica aerogel, water in the air is absorbed due to the hydrophilic properties of a silanol group (Si—OH) on the surface of a silica, so that there is a disadvantage in that the thermal conductivity is gradually increased. Also, there is a problem in that it is difficult to manufacture a super-insulation product having a meso pore since it is difficult to expect a spring break phenomenon due to the intensified pore destruction in a drying process.

Therefore, in order to maintain a low thermal conductivity by suppressing the absorption of moisture in the air, a step of modifying the surface of a silica aerogel so as to be hydrophobic is essentially required.

Accordingly, as described above, the present invention provides a method for producing a silica aerogel blanket, the method capable of solving a problem of the generation of a bad odor during construction by including a step of heat treatment after producing a hydrophobic silica aerogel blanket so as to remove a volatile organic compound (VOC), a silica aerogel blanket produced thereby, and a method for constructing a silica aerogel blanket, the method capable of suppressing the generation of a bad odor during the construction of the silica aerogel blanket on an ultra-high temperature piping equipment, and at the same time, preventing the loss of heat insulation performance due to moisture in the air.

A method for producing a silica aerogel blanket according to an embodiment of the present invention includes: 1) preparing a silica sol by mixing a silica precursor, alcohol, and an acidic aqueous solution; 2) producing a silica gel composite by adding a basic catalyst to the silica sol, and then depositing the silica sol added with the basic catalyst in a base material for blanket; 3) producing a hydrophobic silica aerogel by aging, surface modifying, and drying the silica gel composite; and 4) heat treating the hydrophobic silica aerogel.

Hereinafter, a method for producing a silica aerogel blanket of the present invention will be described in detail, step by step.

Step 1) according to an embodiment of the present invention is a step for preparing a silica sol, wherein the silica sol is prepared by mixing a silica precursor, alcohol, and an acidic aqueous solution.

A silica precursor which can be used in the production of the silica sol may be an alkoxide-based compound containing silicon, specifically, tetraalkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetra-butyl orthosilicate, tetra secondary butyl orthosilicate, tetra tertiary butyl orthosilicate, tetrahexyl orthosilicate, tetracyclohexyl orthosilicate, and tetradodecyl orthosilicate. More specifically, in the case of the present invention, the silica precursor may be tetramethyl orthosilicate (TMOS), tetraethyl orthosilicate (TEOS), or a mixture thereof.

The silica precursor may be used in an amount such that the content of silica ($SiO_2$) contained in a silica sol becomes 0.1 wt % to 30 wt %. If the content of the silica is less than 0.1 wt %, the content of a silica aerogel in the finally produced blanket is too low to achieve the desired level of heat insulation effect. If the content of the silica is greater than 30 wt %, due to an excessive formation of a silica aerogel, there is a possibility that the mechanical properties of the blanket, particularly the flexibility thereof may deteriorate.

In addition, alcohol which can be used in the production of the silica sol of the present invention may specifically be a monohydric alcohol such as methanol, ethanol, isopropanol, and butanol; or a polyhydric alcohol such as glycerol, ethylene glycol, propylene glycol, diethylene glycol, dipropylene glycol, and sorbitol, and any one or a mixture of two or more thereof may be used. When considering the miscibility thereof with water and an aerogel, the alcohol may be a monohydric alcohol having 1 to 6 carbon atoms such as methanol, ethanol, isopropanol, and butanol.

The above alcohol (polar organic solvent) may be used in an appropriate amount in consideration of the degree of hydrophobicity of the finally produced silica aerogel while promoting the surface modification reaction.

Also, an acidic aqueous solution which can be used in the production of a silica sol of the present invention may promote the gelation of the silica sol, later. An acid catalyst contained in the acidic aqueous solution may specifically include one or more kinds of inorganic acid such as nitric acid, hydrochloric acid, acetic acid, sulfuric acid, and hydrofluoric acid, and may be used in an amount so as to promote the gelation of the silica sol, later.

Step 2) according to an embodiment of the present invention is a step for producing a silica gel composite, and may be performed by adding a basic catalyst to the silica sol and depositing the silica sol added with the basic catalyst in a base material for blanket.

The basic catalyst which can be used for producing a silica gel of the present invention serves to promote gelation by increasing the pH of the silica sol.

The basic catalyst may be an inorganic base such as sodium hydroxide and potassium hydroxide; or an organic base such as ammonium hydroxide. However, in the case of an inorganic base, a metal ion included in a compound may be coordinated to a Si—OH compound. Thus, an organic base may be preferred. Specifically, the organic base may be ammonium hydroxide ($NH_4OH$), tetramethylammonium hydroxide (TMAH, tetraethyl ammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino) ethanol, 2-(methylamino) ethanol, N-methyldiethanolamine, dimethylaminoethanol, diethylaminoethanol, nitrilotriethanol, 2-(2-aminoethoxy) ethanol, 1-amino-2-propanol, triethanolamine, monopropanolamine, or dibutanol, and one or a mixture of two or more thereof may be used. More specifically, the base of the present invention may be ammonium hydroxide ($NH_4OH$).

The basic catalyst may be included in an amount such that the pH of the silica sol becomes 4 to 8. If the pH of the silica sol is out of the above range, gelation is not easily achieved, or a gelation rate becomes too slow, thereby deteriorating the processability. In addition, since the base may be precipitated when added in a solid phase, it may be preferable that the base is added in the form of a solution diluted with the above alcohol (polar organic solvent).

Gelation of a method for producing a silica aerogel blanket according to an embodiment of the present invention may be one forming a network structure from a silica precursor material, wherein the network structure may be a planar mesh structure in which specific polygons having one or more types of atomic arrangement are linked to each other, or a structure in which specific polyhedrons share their vertices, edges, faces, etc., with each other to form a three dimensional skeleton structure.

Meanwhile, gelation of the silica sol may occur in a state in which the silica sol is deposited in a base material for blanket.

Specifically, the deposition may be performed in a reaction vessel capable of accommodating a base material for blanket, and may be performed either by pouring a silica sol into the reaction vessel, or by placing a base material for blanket in a reaction vessel containing a silica sol to be soaked. At this time, in order to improve the bonding of the base material for blanket and the silica sol, the base material for blanket may be lightly pressed down so as to be sufficiently deposited. Thereafter, the base material for blanket may be pressed to a predetermined thickness at a constant pressure to remove the remaining silica sol, so that drying time may be reduced.

A base material for blanket which can be used in the present invention may be a film, a sheet, a net, a fiber, a porous body, a foam, a non-woven body, or a laminate of two or more layers thereof. Also, according to the use of a base material for blanket, surface roughness may be formed or patterned on the surface thereof. More specifically, the base material for blanket may be a fiber capable of further improving the heat insulation performance by including a space or a void through which a silica aerogel may be easily inserted into the base material for blanket. Furthermore, the base material for blanket may preferably have a low thermal conductivity.

Specifically, the base material for blanket may be polyamide, polybenzimidazole, polyaramid, an acryl resin, a phenol resin, polyester, polyetheretherketone (PEEK), polyolefin (for example, polyethylene, polypropylene, or a copolymer thereof, and the like), cellulose, carbon, cotton, wool, hemp, a non-woven fabric, a glass fiber, or ceramic wool, and the like. More specifically, the base material for blanket may include a glass fiber or polyethylene.

Step 3) according to an embodiment of the present invention is a step for producing a hydrophobic silica aerogel, and may be performed by aging, surface modifying, and drying the above-produced silica gel composite.

The aging is a process in which the silica gel is left at an appropriate temperature such that the chemical change thereof may be completely achieved. The aging may be performed by leaving the silica gel at a temperature of 50 to 90° C. for 1 to 10 hours in a solution in which an organic solvent or a basic catalyst such as ammonia is diluted in an organic solvent at a concentration of 1 to 10%.

By performing the aging step of the present invention, the formed network structure may be more firmly formed, and mechanical stability may be enhanced.

In addition, the dried silica aerogel maintains a low thermal conductivity rate just after drying, however, absorbs water in the air due to the hydrophilic properties of a silanol group (Si—OH) on the surface of the silica, so that there is a disadvantage in that the thermal conductivity is gradually increased. Therefore, in order to maintain a low thermal conductivity, there is a need to modify the surface of a silica aerogel so as to be hydrophobic. The surface modification of the present invention may be performed by adding one or more kinds of surface modifiers selected from the group consisting of trimethylchlorosilane (TMCS), hexamethyldisilazane (HMDS), methyltrimethoxysilane, trimethylethoxysilane, ethyltriethoxysilane, phenyltriethoxysilane, and polydimethylsiloxane, and more specifically, by adding hexamethyldisilazane (HMDS).

Thereafter, a hydrophobic silica aerogel may be produced through a drying process of removing a solvent while maintaining the pore structure of the hydrophobic silica gel, the surface of which has been modified. The drying process may be performed by an ambient drying process or a supercritical drying process. However, a method for producing a silica aerogel blanket according to an embodiment of the present invention may be performed by a supercritical drying process using a supercritical carbon dioxide.

The ambient drying process does not require high pressure reaction conditions and a special high pressure equipment for supercritical drying, so that the process thereof is simple and economical. However, since water or an organic solvent evaporates at a high temperature, when compared with supercritical drying, ambient drying has a problem in that the heat insulation performance is sharply reduced due to the occurrence of the destruction of the pore structure inside a gel. In addition, the above problem may be further exacerbated when drying is directly performed without substitution with an organic solvent having a low surface tension.

In comparison, the drying of the present invention is capable of maximizing porosity by implementing supercritical drying, so that the heat insulation performance may be far superior to that of a silica gel produced by ambient drying. The present invention is for producing a silica aerogel blanket mainly used for the construction of an ultra-high temperature piping equipment, so that it is essentially required that the silica aerogel blanket produced thereby to have superior heat insulation performance to a silica aerogel blanket used for other uses in addition to a regular heat insulation material.

However, after the supercritical drying, in order to remove a small amount of solvent not completely removed in the supercritical drying step, and a hydrophilic salt which may be generated by ammonia and $CO_2$ inside a gel during the supercritical drying, an ambient drying process may be additionally performed arbitrarily.

Since the additionally performed ambient drying process is not essential and the destruction of the pore structure is not large, a drying process of the present invention is different from an ambient drying process in which the entire solvent is removed by ambient drying in terms of purpose and effect.

Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide becomes to be in a critical state in which gas and liquid cannot be distinguished. Carbon dioxide in a critical state is referred to a supercritical carbon dioxide.

A supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time may be shortened.

The supercritical drying process includes a solvent substitution process in which an aged silica gel is placed into a supercritical drying reactor, $CO_2$ in a liquid state is filled therein, and an alcohol solvent inside a silica aerogel is substituted with $CO_2$. Thereafter, the temperature is raised to 40 to 50° c. at a certain temperature raising rate, specifically, 0.1° c./min to 1° c./min, and the pressure which is greater than a pressure at which carbon dioxide becomes a supercritical state, specifically, pressure of 100 bar to 150 bar is maintained to allow the carbon dioxide to remain in a supercritical state for a certain amount of time, specifically for 20 minutes to 1 hour. In general, carbon dioxide becomes to be in a supercritical state at a temperature of 31° c. and pressure of 73.8 bar. The carbon dioxide is maintained to remain at a certain temperature and certain pressure, at which the carbon dioxide becomes supercritical, for 2 hours to 12 hours, more specifically, 2 hours to 6 hours, and then, the pressure is generally lowered to complete the supercritical drying process so that a hydrophobic silica aerogel may be produced.

Meanwhile, a production method according to an embodiment of the present invention may further perform a washing step before the drying. The washing is a step for removing impurities (sodium ions, unreacted substances, by-products, and the like) generated during the reaction to obtain a hydrophobic silica aerogel with high purity, and may be performed through a dilution process or an exchange process using a nonpolar organic solvent.

Step 4) according to an embodiment of the present invention may be performed by heat treating a hydrophobic silica aerogel at a certain temperature for a certain amount of time.

When a silica aerogel blanket is used as a heat insulation material for a high temperature pipe, particularly used as a heat insulation material for a high temperature pipe of 500° c. or higher, there is a problem in that a seriously bad odor is caused by a volatile organic compound (VOC) generated from a hydrophobic silica aerogel blanket. The VOC, which is the cause of the above bad odor, is caused by a hydrophobic group introduced by surface modification reaction for preventing the problem of thermal conductivity being gradually increased by the absorption of moisture in the air due to the hydrophilic properties of a silanol group (Si—OH).

However, when a hydrophilic silica aerogel blanket is directly produced without surface modification for reducing the bad odor, the pore destruction in a drying process is intensified, and an appropriate level of spring back phenomenon is hard to be expected so that it is not possible to manufacture a product having a desirable ultra-heat insulation performance. The present invention is characterized in that a silica aerogel blanket is produced and then heat treated to produce a silica aerogel blanket from which a hydrophobic group is removed.

Therefore, the heat treating of Step 4) may be performed at a temperature sufficient enough to reduce the VOC, specifically at 500 to 800° c., more specifically at a temperature higher than the temperature of a piping equipment to be actually applied by 0 to 50° c. If a heat treatment temperature is lower than the temperature of a piping equipment to be actually applied, it is not possible to remove the VOC which is the cause of the bad odor sufficiently, so that there may be a problem of causing pain to workers during a construction step. If a heat treatment temperature is excessively high, for example, higher than 800° c., there may be problems of energy waste and the destruction of the pore structure of a silica aerogel.

Also, the heat treating of Step 4) may be performed for a sufficient amount of time to reduce the VOC, specifically for 5 to 1500 minutes, more specifically for 5 to 60 minutes. If heat treatment time is less than 5 minutes, there may be a problem in that the VOC, the cause a bad odor, may not be sufficiently removed. If heat treatment time is more than 1500 minutes, there may be problems of energy waste and the destruction of the pore structure of a silica aerogel.

The present invention also provides a silica aerogel blanket produced by the production method of the present invention, more specifically, a silica aerogel blanket having a carbon content of 1 wt % or less based on the weight of silica aerogel.

Typically, hydrophobicity or a hydrophobic degree of a silica aerogel can be confirmed by measuring a carbon content contained in the silica aerogel, and the carbon content contained in the above silica aerogel can be measured using a carbon analyzer.

In the case of the present invention, a hydrophobic aerogel blanket is produced and then heat treated at a specific temperature for a specific amount of time to remove a hydrophobic group on the surface of a silica aerogel. Thus, the silica aerogel blanket of the present invention is characterized in having a carbon content of 1 wt % or less based on the weight of a silica aerogel.

From this, when constructed on an ultra-high temperature pipe, it can be expected that the generation of a bad odor occurs more than in the case of a silica aerogel blanket having a carbon content of greater than 1 wt %.

Meanwhile, the heat insulation property of a silica aerogel blanket increases as the content of a silica aerogel in a blanket increases. However, if the content is too high, due to low strength and adhesive force of the silica aerogel itself, there is a concern that strength and adhesive force of a blanket may rather be deteriorated when the blanket is produced. Therefore, it is preferable that the content of a silica aerogel contained in a blanket is appropriately adjusted in consideration of the use of the blanket. Specifically, in the case of the present invention, the silica aerogel may be included in an amount of 20 wt % to 80 wt % based on the total weight of a silica aerogel blanket.

In addition, as shown in the schematic diagram of FIG. 1, the present invention provides a method for constructing a silica aerogel blanket including: step 1) constructing at least one layer of the silica aerogel blanket of the present invention on the surface of a piping equipment; and step 2) constructing at least one layer of a hydrophobic silica aerogel blanket on the silica aerogel blanket, wherein the piping equipment may specifically be an ultra-high temperature piping equipment of 500° c. or higher.

Typically, when a hydrophobic silica aerogel blanket is constructed on an ultra-high temperature piping equipment of 500° c. or higher, a bad odor may be generated from the hydrophobic silica aerogel blanket due to heat conducted in a pipe.

However, in this case, if at least one layer of a silica aerogel blanket having a VOC removed therefrom by the production method of the present invention is constructed on the surface of a piping equipment, the VOC is not generated, so that a bad odor generation problem may be solved.

In addition, as in Step 2), in the case in which at least one layer of a hydrophobic silica aerogel blanket is constructed on the silica aerogel blanket of the present invention constructed on the surface of the piping equipment, the hydrophobic silica aerogel is constructed on the outermost layer which is in contact with the air, so that an effect of preventing an increase in thermal conductivity due to the absorption of moisture in the air may be obtained.

In this case, even though a hydrophobic silica aerogel blanket is used, the hydrophobic silica aerogel blanket is not directly constructed on the surface of an ultra-high temperature piping equipment, but constructed on the silica aerogel blanket of the present invention, so that heat conducted in a pipe is greatly reduced, and therefore a bad odor problem of may not occur.

As described above, according to the silica aerogel blanket construction method of the present invention, it is possible to obtain effects of suppressing the generation of a bad odor, and at the same time, preventing the loss of heat insulation performance due to moisture in the air.

Hereinafter, examples of the present invention will be described in detail so that those skilled in the art can easily carry out the present invention. The present invention may, however, be embodied in many different forms and is not limited to the examples set forth herein.

Example 1

Tetraethyl orthosilicate and ethanol were mixed in a weight ratio of 3:1 to prepare a mixed solution (silica content=4 wt %). Thereafter, a hydrochloric acid solution (concentration=0.15%) diluted in water was added thereto so that the pH of the mixed solution became 1, and then mixed to produce an alkoxide silica sol. A glass fiber was deposited in the produced silica sol, and an ammonia catalyst was added thereto in an amount of 0.5 vol % for gelation to produce a silica wet gel composite. The produced silica wet gel composite was left in an ethanol solution at a temperature of 70° c. for 1 hour to be aged. Thereafter, a surface modifier solution prepared by mixing hexamethyldisilazane and ethanol in a volume ratio of 1:19 was added to the wet gel at 90% by volume, and surface modification was performed at 70° c. for 4 hours to produce a hydrophobic silica wet gel composite. The hydrophobic silica wet gel was placed in a supercritical extractor of 7.2 L and $CO_2$ was injected thereto. Thereafter, the temperature in the extractor was raised to 60° c. over the period of 1 hour, and supercritical drying was performed at 50° c. and 100 bar. At this time, ethanol was recovered through a lower end of a separator. Thereafter, $CO_2$ was vented over the period of 2 hours, and ambient drying was additionally performed in an oven of 150° c. to produce a hydrophobic silica aerogel blanket. Thereafter, heat treatment was performed for 10 minutes in a reactor of 500° c. to produce a silica aerogel blanket.

Example 2

A silica aerogel blanket was produced in the same manner as in Example 1, except that heat treatment was performed for 1 hour in Example 1.

Example 3

A silica aerogel blanket was produced in the same manner as in Example 1, except that heat treatment was performed for 24 hour in Example 1.

Example 4

A silica aerogel blanket was produced in the same manner as in Example 1, except that heat treatment was performed at 600° c.

Example 5

A silica aerogel blanket was produced in the same manner as in Example 1, except that heat treatment was performed at 700° c.

Example 6

A silica aerogel blanket was produced in the same manner as in Example 1, except that heat treatment was performed at 800° c.

Comparative Example 1

A silica aerogel blanket was produced in the same manner as in Example 1, except that heat treatment was not performed.

Comparative Example 2

A silica aerogel blanket was produced in the same manner as in Example 1, except that heat treatment was performed at 850° c.

Comparative Example 3

A silica aerogel blanket was produced in the same manner as in Example 1, except that heat treatment was performed at 900° c.

Experimental Example: TGA Experiment

The hydrophobic aerogel blanket produced in Example 1 before heat treatment was heat treated at different temperatures using STA 449 F5 of NETZSCH Co. The weight change of a silica aerogel was measured, and the results are shown in FIG. 2.

Figure 2:
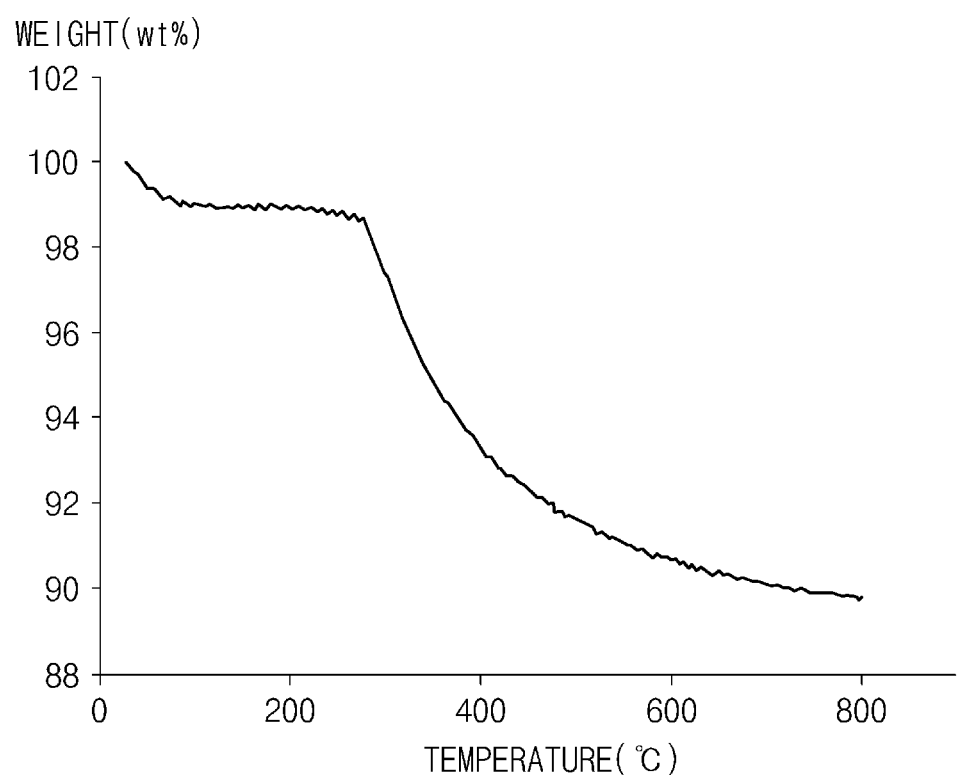
FIG. 2 is a TGA graph showing the weight change of a silica aerogel according to the heat treatment temperature of the present invention.

The present experiment is to show a VOC removal effect according to a heat treatment temperature, and as shown in FIG. 2, when a heat treatment temperature was lower than about 300° c., the weight of a silica aerogel was hardly changed. However, it was confirmed that there was a sharp change in weight when the temperature was higher.

From this, it can be understood that even if a heat treatment process is performed, when heat treatment is performed at a low temperature of about 300° c., VOCs are hardly removed, so that a bad odor generation problem may still remain. However, when heat treatment was performed at about 500° c. as in the embodiment of the present invention, based on the fact that the weight change was remarkable, it could be understood that the VOC, the cause of a bad odor, was mostly removed, so that the possibility of the generation of a bad odor causing pain to workers during construction was greatly reduced.

In the meantime, when a heat treatment temperature was higher than 800° c., the weight change was gradual. From this, it can be understood that when a heat treatment temperature is excessively high, the effect of reducing a bad odor is insignificant, however there is a problem of energy waste, thereby not suitable.

Through the above experiment, it is possible to confirm an appropriate temperature range for producing a silica aerogel blanket of the present invention, which is sufficient enough to reduce a VOC without energy waste, and to maintain heat insulation performance.

Experimental Example 2: Measurement of Carbon Content

Only a silica aerogel of the silica aerogel blanket prepared in Examples 1 to 6 and Comparative Examples 1 to 3 was recovered, and then the carbon content of each silica aerogel blanket was measured using a carbon analyzer. The results are shown in Table 1.

TABLE 1

| | Heat treatment temperature(° C.) | Heat treatment time period(minute) | Carbon content(wt %) |
|---|---|---|---|
| Example 1 | 500 | 10 | 0.7471 |
| Example 2 | 500 | 60(1 hour) | 0.2502 |
| Example 3 | 500 | 1440(24 hours) | 0.1044 |
| Example 4 | 600 | 10 | 0.3761 |
| Example 5 | 700 | 10 | 0.2155 |
| Example 6 | 800 | 10 | 0.1064 |
| Comparative Example 1 | — | — | 6.9079 |
| Comparative Example 2 | 850 | 10 | 0.1061 |
| Comparative Example 3 | 900 | 10 | 0.1056 |

From the analysis result, it was confirmed that a silica aerogel blanket of the present invention, in which heat treatment was performed, had most of hydrophobic groups were removed therefrom even by a short period time of heat treatment of 1 hour or less. On the other hand, it was confirmed that a silica aerogel blanket of Comparative Example 1, in which heat treatment was not performed, contained a great number of carbons, so that it was expected that the generation of a bad odor would be substantial when the silica aerogel blanket constructed on a high temperature pipe.

In addition, concerning a heat treatment temperature, when a heat treatment temperature was 500 to 800° c., the decrease in the carbon content was substantial. On the other hand, in the cases of Comparative Examples 2 and 3 in which a heat treatment temperature was higher than 800° c., the decrease in the carbon content was not substantial. Therefore, it could be understood that the effect of reducing the generation of a bad odor was insignificant, however, energy was wasted, so that the heat treatment temperature was not suitable.

From this, it can be expected that the generation of a bad odor may be suppressed when a silica aerogel blanket of the present invention is constructed on a high temperature pipe since most of volatile organic compounds (VOC) were removed only by a short amount time of heat treatment at an appropriate temperature of 500 to 800° c.

Experimental Example 3: Measurement of GS/MSD

VOCs of the silica aerogel blanket produced in Example 2 and Comparative Example 1 were analyzed using Purge & Trap sampler—GS/MSD system, and the results are shown in Table 2.

Specifically, a sample was placed in a tube furnace, and air was injected at a flow rate of 4 cc/min. Gas generated between 300° c. and 500° c. was collected in a tedlar bag, and the content thereof was analyzed using GS/MSD equipment (EQC-0176).

TABLE 2

| Rt (min) | Compound | 0.5 L Sampling (μg/L) | |
|---|---|---|---|
| | | Comparative Example 1 | Example 2 |
| 2.0 | Butene | — | 2.5 |
| 2.6 | Fluorotrimethylsilane | 36.6 | — |
| 2.7 | EtOH | 260.0 | 0.4 |
| 2.8 | Acetone | 69.8 | 0.5 |
| 2.9 | Methoxytrimethylsilane | 34.6 | — |
| 3.0 | Trimethylsilanol | 248.7 | — |
| 3.1 | MEK | 32.6 | — |
| 3.2 | Ethoxytrimethylsilane | 196.0 | — |
| 3.6 | Benzene | 42.9 | 0.1 |
| 3.7 | Hexamethyldisioxane | 111.5 | — |
| 4.4 | 1,1-Diethoxysilane | 7.7 | — |
| 5.1 | Toluene | 12.3 | 0.1 |
| 5.6 | Dimethyldiethoxysilane | 4.4 | — |
| 7.6 | Xylene | 2.0 | — |
| 2.5~22 | Others | — | 0.7 |
| | Sum | 1059.1 | 4.6 |

As shown in Table 2, the silica aerogel blanket produced according to Example 2 of the present invention in which heat treatment was performed had most of VOCs such as trimethylsilanol, ethoxytrimethylsilane or hexamethyldisiloxan removed therefrom compared with the silica aerogel blanket of Comparative Example 1 in which heat treatment was not performed.

From this, it can be expected that the generation of a bad odor may be suppressed when a silica aerogel blanket of the present invention is constructed on a high temperature pipe since most of volatile organic compounds (VOC) were removed.

Experimental Example 4: Measurement of Flame Retardancy

A wire was put into contact with a silica aerogel blanket sample produced in Example 2 and Comparative Example 1, and then the wire was heated to 1050° c. in order to observe smoke, a bad odor, and soot formation. The results are shown in FIG. 3.

Figure 3:
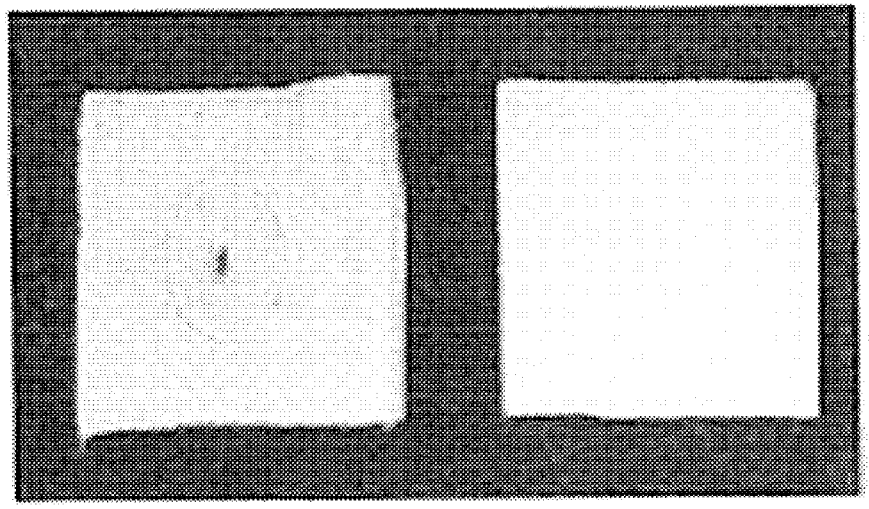
FIG. 3 is a photograph showing the result of flame retardancy test of a silica aerogel according to an example and a comparative example of the present invention.

As shown in FIG. 3, the silica aerogel blanket produced according to Example 2 of the present invention in which heat treatment was performed had no soot formed even when came into contact with a glow wire of 1050° c. However, in the case of the silica aerogel blanket of Comparative Example 1 in which heat treatment was not performed, it was confirmed that smoke, a bad odor, and soot were generated and flame appeared.

From this, it can be expected that the generation of a bad odor may be suppressed when a silica aerogel blanket of the present invention is constructed on a high temperature pipe since most of volatile organic compounds (VOC) were removed through heat treatment.

Experimental Example 5: Measurement of Thermal Conductivity

Figure 4:
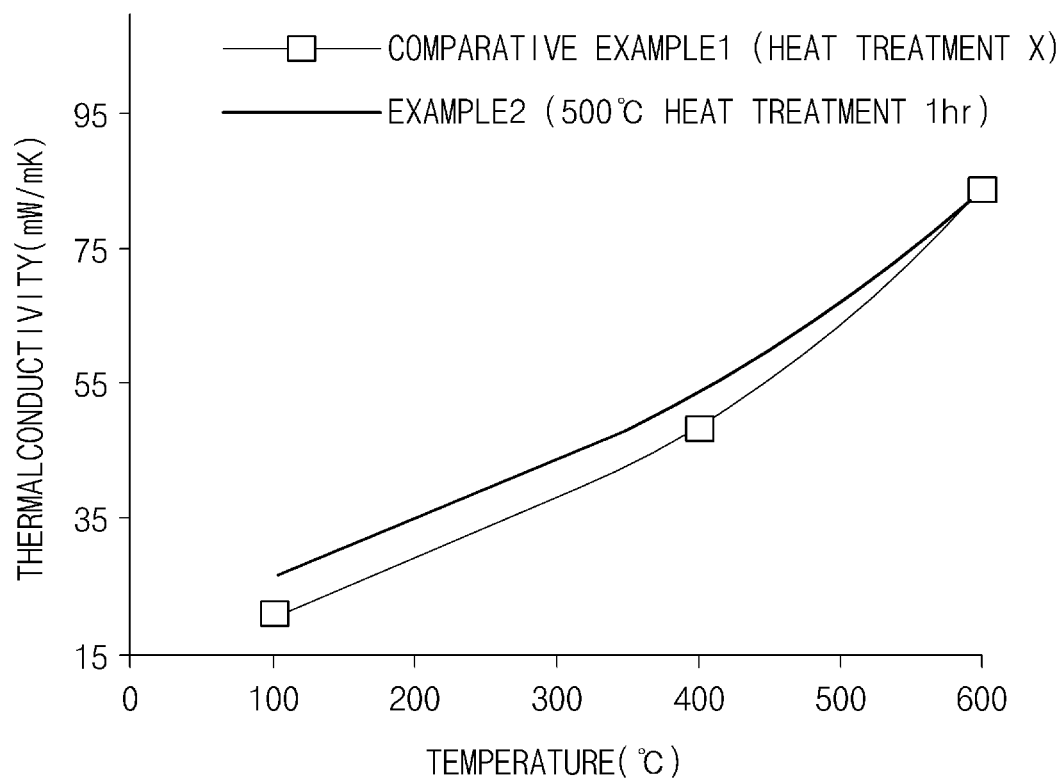
FIG. 4 is a graph showing the thermal conductivity of a silica aerogel according to an example and a comparative example of the present invention.

1) The guarded hot plate (GHP) high temperature thermal conductivity of the silica aerogel blanket produced in Example 2 and Comparative Example 1 was measured using GHP 456 equipment of NETZSCH Co., and the results are shown in FIG. 4.

2) Also, the room temperature (25° c.) thermal conductivity of the silica aerogel blanket produced in Examples 1 to 6 and Comparative Examples 1 to 3 was measured using GHP 456 equipment of NETZSCH Co., and the results are shown in Table 3.

(High Temperature Thermal Conductivity)

As shown in Table 4, the thermal conductivity of the silica aerogel blanket produced according to Examples 1 to 6 of the present invention was slightly increased compared with the thermal conductivity of the silica aerogel blanket of Comparative Example 1 in which heat treatment was not performed. However, at a temperature of 500° c. or higher, the thermal conductivity was almost equal to or similar to that of Comparative Example, so that it was confirmed that there was no deterioration of heat insulation performance.

As described above, when a silica aerogel blanket of the present invention in which heat treatment was performed was used for an ultra-high temperature piping equipment of 500° c. or higher, it was confirmed that the generation of a bad odor was suppressed, and at the same time, heat insulation performance was excellent.

TABLE 3

| | Thickness (mm) | Thermal conductivity (mW/mK) |
|---|---|---|
| Example 1 | 10.2 | 19.2 |
| Example 2 | 10.2 | 19.5 |
| Example 3 | 10.2 | 19.8 |
| Example 4 | 10.1 | 19.9 |
| Example 5 | 10.1 | 19.8 |
| Example 6 | 10.0 | 20.0 |
| Comparative Example 1 | 10.3 | 18.0 |
| Comparative Example 2 | 9.3 | 22.9 |
| Comparative Example 3 | 9.0 | 24.7 |

As shown in Table 3, concerning a heat treatment temperature, the silica aerogel blanket produced by Examples 1 to 6 in which a heat treatment temperature was 500 to 800° c. had a low thermal conductivity, so that the heat insulation performance thereof was excellent. However, in Comparative Examples 2 and 3 in which the heat treatment temperature was higher than 800° c., the decrease in the amount of carbon content was not as large as in Experimental Example 2 so that only energy was wasted while the effect of reducing a bad odor was insignificant. Furthermore, since heat insulation performance was deteriorated due to the destruction of the pore structure of the silica aerogel, it was confirmed that the heat temperature was suitable for producing a silica aerogel blanket for heat insulation.

Meanwhile, the silica aerogel blanket of Comparative Example 1 has excellent heat insulation performance. However, as seen in Experimental Example 2, the generation of a bad odor was substantial when the silica aerogel blanket was constructed on a high temperature pipe, thereby not suitable to be constructed on the high temperature pipe.

From this, it can be expected that the generation of a bad odor may be suppressed when a silica aerogel blanket of the present invention is constructed on a high temperature pipe since most of volatile organic compounds (VOC) were removed only by a short amount time of heat treatment at an appropriate temperature of 500 to 800° c.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

The invention claimed is:

1. A method for producing a silica aerogel blanket, the method comprising the steps of:
   1) preparing a silica sol by mixing a silica precursor, alcohol, and an acidic aqueous solution;
   2) producing a silica gel composite by adding a basic catalyst to the silica sol, and then depositing the silica sol added with the basic catalyst in a base material for blanket;
   3) producing a hydrophobic silica aerogel by aging, surface modifying, and drying the silica gel composite; and
   4) heat treating the hydrophobic silica aerogel at a temperature of 500 to 800° C.

2. The method of claim 1, wherein the acidic aqueous solution of Step 1) comprises one or more kinds of acid catalysts selected from the group consisting of nitric acid, hydrochloric acid, acetic acid, sulfuric acid, and hydrofluoric acid.

3. The method of claim 1, wherein the basic catalyst of Step 2) comprises one or more selected from the group consisting of ammonium hydroxide (NH4OH), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino) ethanol, 2-(methylamino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, and dibutanolamine.

4. The method of claim 1, wherein the base material for blanket comprises a film, a sheet, a net, a fiber, a porous body, a foam, a non-woven body, or a laminate of two or more layers thereof.

5. The method of claim 1, wherein the surface modifying of Step 3) is performed by adding one or more kinds of surface modifiers selected from the group consisting of trimethylchlorosilane (TMCS), hexamethyldisilazane (HMDS), methyltrimethoxysilane, trimethylethoxysilane, ethyltriethoxysilane, phenyltriethoxysilane, and polydimethylsiloxane.

6. The method of claim 1, wherein the drying of Step 3) is performed by a supercritical drying process.

7. The method of claim 1, wherein the heat treating of Step 4) is performed for 5 to 1500 minutes.

8. A silica aerogel blanket produced by the method of claim 1, and having a carbon content of 1 wt % or less based on the weight of a silica aerogel.

9. The silica aerogel blanket of claim 8, wherein the silica aerogel blanket is for ultra-high temperature of 500° C. or higher.

10. A method for constructing a silica aerogel blanket, the method comprising the steps of:
    1) constructing at least one layer of the silica aerogel blanket of claim 8 on the surface of a piping equipment; and
    2) constructing at least one layer of a hydrophobic silica aerogel blanket on the silica aerogel blanket.

11. The method of claim 10, wherein the piping equipment is a piping equipment for ultra-temperature of 500° C. or higher.

* * * * *